Patented Sept. 26, 1922.

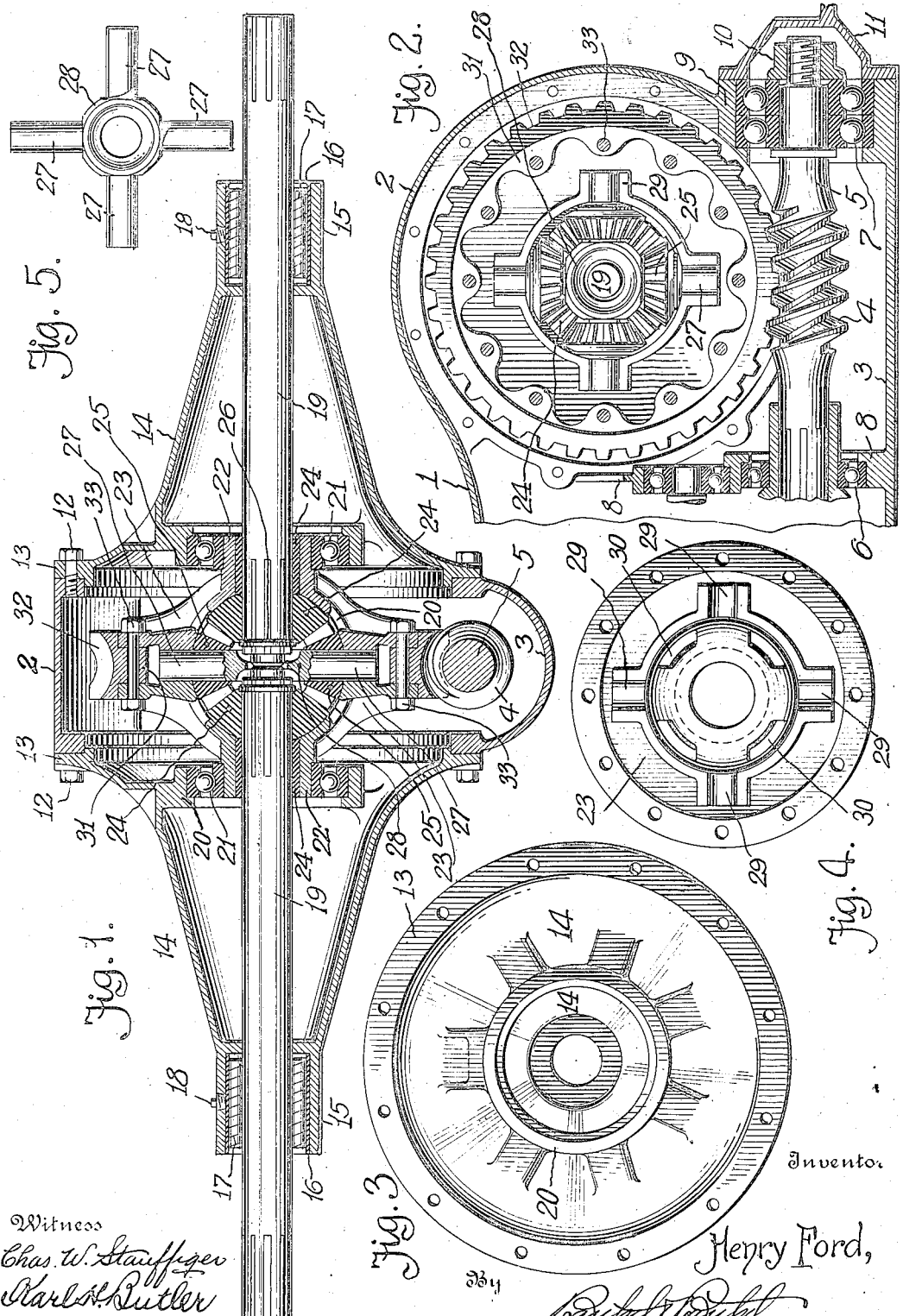

1,430,367

UNITED STATES PATENT OFFICE.

HENRY FORD, OF DEARBORN, MICHIGAN.

REAR-AXLE CONSTRUCTION.

Application filed July 10, 1918. Serial No. 244,151.

*To all whom it may concern:*

Be it known that I, HENRY FORD, a citizen of the United States of America, residing at Dearborn, in the county of Wayne and State of Michigan, have invented certain new and useful Improvements in Rear-Axle Construction, of which the following is a specification, reference being had therein to the accompanying drawings.

This invention relates to a rear axle construction for vehicles, and has special reference to a rear axle assembly, including a differential mechanism and worm drive, that may be advantageously used in connection with a tractor or heavy duty machine.

My invention aims to provide a rear axle construction of the above type wherein the differential mechanism is assembled as a unit and may be expeditiously removed, together with the rear axle, from the rear axle shaft housing, after which the differential housing and the mechanism therein may be readily disassembled. With the same facility the worm drive may be removed after the differential unit, and in constructing and assembling the various elements of the rear axle construction as will hereinafter be set forth, it is possible to expeditiously manufacture this part of a tractor and permit of repairs being quickly made.

Reference will now be had to the drawings, wherein—

Figure 1 is a longitudinal sectional view of the rear axle assembly;

Fig. 2 is a cross sectional view of the differential housing, showing the worm drive;

Fig. 3 is an end view of one section of the rear axle shaft housing;

Fig. 4 is a similar view of one section of the differential housing; and

Fig. 5 is an elevation of the differential spider.

In the drawing, the reference numeral 1 denotes a portion of a transmission mechanism housing adapted to form part of a tractor or similar vehicle, and the rear end of the transmission housing is somewhat cylindrical, as at 2, and provides a well 3 for a longitudinally disposed worm 4. The worm forms part of a shaft 5 that extends forwardly into the transmission mechanism housing 1 and is adapted to have movement imparted thereto by the transmission mechanism. A shaft 5 is journaled in ball bearings 6 and 7, the former being supported in a transverse partition 8 in the housing 1, while the latter are placed in a bearing 9 at the rear end of the well 3 and are retained in position by a nut 10 mounted on the end of a worm shaft 5. A draw bar cap 11 is connected to the rear end of the well 3 and incloses the nut 10. The draw bar cap 11 permits of implements being attached to the rear end of the transmission housing, and also permits of the worm shaft 5 being removed from the rear end of the transmission housing after the differential mechanism is removed.

Connected to the sides of the transmission housing 1 by a plurality of cap screws 12 are the caps or inner large ends of rear axle housings 14, said housings tapering inwardly from the caps 13 and terminating in cylindrical bearing portions 15, which accommodate bearing sleeves 16, roller bearings 17 and grease plugs 18. The rear axle housings 14 cooperate with the transmission housings in providing a rigid hollow structure which affords an enclosure for a differential mechanism, and an inclosure for alining rear axle shafts 19. The shafts 19 are journaled in the roller bearings 17 and the outer ends of said shafts are adapted to accommodate the rear wheels of a tractor, while the inner ends of said shafts abut or confront each other centrally of the differential mechanism.

The caps 13 of the axle housings 14 are provided with concentric supports 20 for ball bearings 21 and journaled in said ball bearings are the gudgeons or tubular ends 22 of a differential housing composed of members 23. The gudgeons or tubular ends 22 of the differential housing accommodate bushings or bearing sleeves 24 through which the inner ends of the rear axle shafts extend.

The members 23 of the differential housing are somewhat hemispherical and when placed together provide a spherical inclosure for differential gears 24 and differential pinions 25. The differential gears 24 are keyed or otherwise mounted on the inner ends of the rear axle shafts 19 for rotation therewith and the inner ends of the shafts 19 are provided with split locking rings 26.

The differential pinions 25 are rotatable on stud shafts or pins 27 forming part of a differential spider 28 which is located between the differential gears 24 and provides clearance for the confronting or abutting ends of the rear axle shafts. The differential pinions are four in number and have the axes thereof disposed at right angles to the axis of the rear axle housing, and in consequence of this arrangement the differential pinions compensate for the difference in speed of rotation of the two rear wheels of the tractor, when making a turn.

The differential pinions 25 are loose on the stud shafts or pins 7 of the spider and the ends of the stud shafts 27 are held in semicylindrical confronting bearings 29 of the differential housing members, said members having openings 30 so that the differential gears and pinions may be lubricated.

Clamped between the differential housing members 23 are the apertured lugs 31 of a worm wheel 32 and said worm wheel is held by a plurality of bolts 33 which also clamp the differential housing members 23 together. The worm wheel 32 meshes with the worm 4 and said worm wheel together with the differential housing constitutes a unit that may be bodily removed from the rear end of the transmission housing 1, after the rear axle shaft housings 14 are removed.

The worm wheel and the differential housings can then be taken apart by removing the bolts 33 holding them together, and the differential gears may be removed from the rear axle shafts by shifting said gears along the shafts to expose the split locking rings 26, so that the locking rings may be removed and the gears withdrawn from the ends of the shafts.

Considerable importance is attached to the fact that the rear axle housings are rigidly held at the sides of the transmission housing and that by removing the rear axle housing, the differential mechanism may be removed as a unit and thus permit of easy access being had to the worm 4 when it is desired to remove the same from the end of the transmission housing.

Furthermore, the shape of the housing members 23 is such, compared to the differential gears 24, that the concave or hemispherical faces of said members back up the convex or hemispherical faces of the gears, thus allowing the member 23 to absorb any thrust of the gears.

What I claim is:—

1. In a rear axle construction for tractors, the combination of a transmission housing, rear axle housings connected to the sides thereof, rear axle shafts journaled in said housings and having the inner ends thereof centrally of said transmission housing, a differential mechanism at the inner ends of said shafts within said transmission housing and adapted to be removed from either end of said transmission housing as a unit, and a driven worm in the lower part of the transmission housing adapted for imparting movement to said differential mechanism.

2. In a rear axle construction for tractors, the combination of a transmission housing, rear axle housings connected to the sides thereof, rear axle shafts journaled in said housings and extending into said transmission housing with the ends of said axle shafts centrally of said transmission housing, a differential mechanism in said transmission housing and bodily removable in an axial direction from said housing, and including a worm wheel adapted for imparting movement to the rear axle shafts and a driven worm in said transmission housing adapted to impart movement to the worm wheel of said differential mechanism.

3. A rear axle construction for vehicles, comprising rear axle housings, rear axle shafts journaled in said axle housings and having ends in confronting relation, a differential mechanism supported solely by said axle housings at points set in from the inner end faces of said housings, said differential mechanism being about the confronting ends of said rear axle shafts and including a worm wheel adapted to impart movement to said rear axle shafts, and a driven worm under said differential mechanism meshing with the worm wheel thereof and adapted for imparting movement to said differential mechanism.

4. In a rear axle construction for tractors, the combination of a transmission housing having large end openings, rear axle housings connected to the sides thereof, rear axle shafts in said rear axle housings and extending to a point centrally of said transmission housing, differential mechanism in said transmission housing equally supported from said axle housings adapted for imparting movement to said shafts and bodily removable from either end opening of said housing, driving means in the lower part of said transmission housing adapted for imparting movement to said differential mechanism, and means in connection with said transmission housing whereby said driving means may be removed from the rear end thereof.

5. A rear axle construction comprising a transmission housing, rear axle housings connected to opposite sides of said transmission housing, rear axle shafts journaled in said rear axle housings, and a differential mechanism for driving said axle shafts, said differential mechanism being located within said transmission housing and supported by said axle housings independent of said transmission housing and adapted to be removed therefrom as a unit when one or the other of said rear axle housings is removed.

6. In a rear axle construction wherein rear axle housings are connected to the sides of a transmission housing, and shafts extend through said rear axle housings into said transmission housing:—a differential mechanism for said shafts, said differential mechanism including a housing having end portions solely supported by said rear axle housings independent of said transmission housing and said shafts.

In testimony whereof I affix my signature in presence of two witnesses.

HENRY FORD.

Witnesses:
 CHAS. E. SORUSE,
 ERNEST KANZLER.